(12) United States Patent
Ross et al.

(10) Patent No.: US 7,844,898 B2
(45) Date of Patent: Nov. 30, 2010

(54) EXPORTING A DOCUMENT IN MULTIPLE FORMATS

(75) Inventors: Benjamen E. Ross, Seattle, WA (US); Stephen M. Blanding, Redmond, WA (US); Zhenjun Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1004 days.

(21) Appl. No.: 11/364,681

(22) Filed: Feb. 28, 2006

(65) Prior Publication Data

US 2007/0204217 A1 Aug. 30, 2007

(51) Int. Cl.
*G06F 17/21* (2006.01)

(52) U.S. Cl. ...................................................... 715/249

(58) Field of Classification Search .................. 715/523, 715/249
See application file for complete search history.

(56) References Cited

U.S. PATENT DOCUMENTS

| | | | |
|---|---|---|---|
| 5,911,776 A | 6/1999 | Guck | 709/217 |
| 6,421,055 B1* | 7/2002 | Jones et al. | 345/471 |
| 6,751,780 B1 | 6/2004 | Neff et al. | 715/530 |
| 7,315,907 B2* | 1/2008 | Takanashi et al. | 710/46 |
| 7,421,450 B1* | 9/2008 | Mazzarella et al. | 707/102 |
| 2001/0047372 A1 | 11/2001 | Gorelik et al. | 707/514 |
| 2002/0129002 A1 | 9/2002 | Alberts et al. | 707/1 |
| 2003/0061200 A1 | 3/2003 | Hubert et al. | 707/3 |
| 2003/0200507 A1 | 10/2003 | Stern et al. | 715/517 |
| 2003/0210834 A1* | 11/2003 | Hitchcock et al. | 382/299 |
| 2004/0034834 A1* | 2/2004 | Pirie et al. | 715/527 |
| 2004/0047519 A1* | 3/2004 | Gennart et al. | 382/298 |
| 2004/0073868 A1 | 4/2004 | Easter et al. | 715/507 |
| 2004/0205578 A1 | 10/2004 | Wolff et al. | 715/513 |
| 2005/0262439 A1 | 11/2005 | Cameron | 715/523 |
| 2005/0289182 A1 | 12/2005 | Pandian et al. | 707/104.1 |
| 2006/0029093 A1* | 2/2006 | Van Rossum | 370/432 |

FOREIGN PATENT DOCUMENTS

EP 1 447 756 A1 8/2004

OTHER PUBLICATIONS

"Publishing for Everyone Using Accessibility Features and Techniques in Adobe FrameMaker 7.2," pp. 1-7, Internet site.
Crystal Reports Features: Report Viewing and Interaction, 3 pages, Internet site.
Aspose.Word 3.4.0.0—Windows—Version Tracker, 4 pages, Internet site.

* cited by examiner

*Primary Examiner*—Doug Hutton
*Assistant Examiner*—Tionna Smith
(74) *Attorney, Agent, or Firm*—Merchant & Gould

(57) ABSTRACT

Systems and methods are disclosed for exporting a document in multiple formats. The disclosed systems and methods may include creating a metafile including content associated with the document and injecting comments into the metafile. The comments may comprise semantic information corresponding to the document. Also, the metafile may be parsed to create at least one call. The at least one call may be configured to enable an export engine to render the document. Furthermore, the at least one call may be sent to the export engine configured to render the document in an output format associated with the export engine. In addition, the export engine maybe selected from a plurality of export engines based upon user input indicating the output format associated with the selected export engine.

20 Claims, 14 Drawing Sheets

```
HRESULT MsoHrBeginStructNodeInEmf(HDC hdc,
                                  int idNodeParent,
                                  int iSortOrder,
                                  BOOL fContentNode,
                       const MSODOCEXSTRUCTNODE * pstructnode);

MSOAPI_(HRESULT) MsoHrEndStructContentNodeInEmf(HDC hdc);
```

*FIG. 4*

```
struct DocExComment_BeginStructNode
{
    DWORD ident;
    DWORD iComment;
    int idNodeParent;
    int iSortOrder;
    int idNode;
    MSODOCEXSTRUCTTYPE nodetype;
    BOOL fContentNode;
    int cwchAltText;
};
```

*FIG. 5*

```
struct DocExComment_EndStructNode
{
    DWORD ident;        // this contains msodocexsignature
    DWORD iComment;     // this contains msodocexcommentEndGlyphText;
};
```

FIG. 6

```
HRESULT MsoHrBeginTextRunInEmf(HDC hdc,
                               LCID lcid,
                               const int * rgiGlyphIndex,
                               const WCHAR * pwchActualText);
HRESULT MsoHrEndTextRunInEmf(HDC hdc);
```

FIG. 7

```
struct DocExComment_BeginTextRun
{
    DWORD ident;
    DWORD iComment;
    DWORD lcid;
    int cGlyphIndex;
    int cwchActualText;
};
```

FIG. 8

```
HRESULT MsoHrEmitExternalHyperlinkToEmf(HDC hdc,
                                        LPCWSTR wzLink,
                                        const RECT * prcdvSrc);
HRESULT MsoHrEmitInternalHyperlinkToEmf(HDC hdc,
                                        DWORD iTargetPage,
                                        float xtfvTarget,
                                        float ytfvTarget,
                                        float dytfTargetPage,
                                        const RECT * prcdvSrc);
```

FIG. 9

```
struct DocExComment_ExternalHyperlink
{
    DWORD ident;
    DWORD iComment;
    RECT  rcdvRegion;
    WCHAR wzLink[MAX_PATH];
};
```

FIG. 10

```
DECLARE_INTERFACE_(IMsoDocExporter, IUnknown)
{
    // IUnknown
    MSOMETHOD(QueryInterface)  (THIS_ REFIID refiid, void ** ppvObject) PURE;
    MSOMETHOD_(ULONG, AddRef)  (THIS) PURE;
    MSOMETHOD_(ULONG, Release) (THIS) PURE;

// IMsoDocExporter
    MSOMETHOD(HrCreateDoc)  (THIS_ const WCHAR * wzDocExFile) PURE;
    MSOMETHOD(HrCreateDocDRM) (THIS_ const WCHAR * wzDocExFile, IMsoDrmDocument * pDrmDocument,
                                DWORD grfdrmFlags) PURE;

MSOMETHOD_(void, SetOutputOption)(MSODOCEXOPTION docexoption, DWORD dwVal) PURE;
    MSOMETHOD_(void, GetOutputOption)(MSODOCEXOPTION docexoption, DWORD* pdwVal) PURE;

MSOMETHOD(HrAddPageFromEmf) (THIS_ HENHMETAFILE hemf) PURE;

MSOMETHOD(HrAddExternalHyperlink) (THIS_ LPCWSTR wzLink , const Gdiplus::RectF * prctv) PURE;
    MSOMETHOD(HrAddInternalHyperlink) (THIS_ DWORD iPage, float xtfvTarget, float ytfvTarget,
                                float dytfTargetPage, const Gdiplus::RectF * prctvSource) PURE;

MSOMETHOD(HrAddDocumentMetadataString)  (THIS_ MSODOCEXMETADATA metadataType,
                                const WCHAR * pwchValue) PURE;
    MSOMETHOD(HrAddDocumentMetadataDate)    (THIS_ MSODOCEXMETADATA metadataType,
                                const FILETIME * pftLocalTime) PURE;
    MSOMETHOD(HrAddDocumentCustomMetadataString) (THIS_ const char * pchName,
                                const WCHAR * pwchValue) PURE;

MSOMETHOD(HrSetDefaultLcid) (THIS_ DWORD lcid) PURE;

MSOMETHOD(HrAddOutlineNode) (THIS_ int idNodeParent,
                                const MSODOCEXOUTLINENODE * pNode) PURE;

MSOMETHOD(HrFinalize) (THIS) PURE;

```
typedef enum
{
        msodocexMetadataTitle = 0,
        msodocexMetadataAuthor,
        msodocexMetadataSubject,
        msodocexMetadataKeywords,
        msodocexMetadataCreator,
        msodocexMetadataProducer,
        msodocexMetadataCreationDate,
        msodocexMetadataModDate,
        msodocexMetadataMax,
} MSODOCEXMETADATA
```

*FIG. 12*

```
typedef struct _MsoDocexOutlineNode
{
    int idNode;
    WCHAR rgwchNodeText[cwchMaxNodeText];
    int iDestPage;
    float dytfvDestPage;
    float dxtfvDestOffset;
    float dytfvDestOffset;
} MSODOCEXOUTLINENODE;
```

```
class IDocExDocument
{
    public:
    virtual HRESULT HrInitialize(IDocExSite * pDocExSite) = 0;
    virtual HRESULT HrInitializeEx(IDocExSite * pDocExSite, IMsoDrmDocument *
pDrmDocument,              MSODRMFLAGS grfdrmFlags) = 0;
    virtual HRESULT HrAppendPage(IDocExPage** ppPage, float dxtfPage, float
dytfPage) = 0;
    virtual HRESULT HrAddDocumentMetadataString(MSODOCEXMETADATA metadataType,
                                  const WCHAR * pwchValue) = 0;
    virtual HRESULT HrAddDocumentMetadataDate(MSODOCEXMETADATA metadataType, const
FILETIME* pftUT)=0;
    virtual HRESULT HrAddDocumentCustomMetadataString(const char* pchName, const
WCHAR* pwchValue)=0;
    virtual void SetDefaultLanguage(const char* pchLangTag) = 0;
    virtual void GetDefaultLanguage(char* rgchBuf, int cchBuf) = 0;
    virtual HRESULT HrFinalizeDocOutline(CSparseTree<MSODOCEXOUTLINENODE> *
pstreeOutline) = 0;
    virtual HRESULT HrFinalizeDocStruct(CSparseTree<DOCEXSTRUCT> * pstreeStruct) =
0;
    virtual HRESULT HrFinalize() = 0;
    virtual HRESULT HrSerialize(const WCHAR * wzOutputFile) = 0;
};
```

```
class IDocExPage
{
    virtual HRESULT HrFinalize() = 0;

virtual BOOL FSupportedDocexPen(const DOCEXPEN * ppen, Gdiplus::GpPath* pgppath) = 0;
    virtual HRESULT HrRenderPath(Gdiplus::GpPath* pgppath,
                                 const DOCEXBRUSH* pbrush,
                                 const DOCEXPEN* ppen,
                                 Gdiplus::GpPath* pgppathClip) = 0;

virtual HRESULT HrRenderImage(const Gdiplus::PointF* rgpttfv,
                                  const DOCEXIMAGE *pImage,
                                  Gdiplus::GpPath* pgppathClip) = 0;

virtual HRESULT HrStartMetafile(const Gdiplus::PointF * ppttv,
                                    float dxtfSrcRect,
                                    float dytfSrcRect,
                                    Gdiplus::PointF* ppttfPageSizeOld,
                                    Gdiplus::GpPath* pgppathClip) = 0;
    virtual HRESULT HrEndMetafile(Gdiplus::PointF pttfPageSizeOld) = 0;

virtual HRESULT HrRenderText(Gdiplus::PointF pttfvBaselineLeft,
                                 const DOCEXTEXT *ptext,
                                 const DOCEXFONT *pfont,
                                 const DOCEXBRUSH *pbrush,
                                 Gdiplus::GpPath* pgppathClip) = 0;

virtual HRESULT HrAddExternalHyperlink(LPCWSTR lpLink , const Gdiplus::RectF * prctfv) = 0;
    virtual HRESULT HrAddInternalHyperlink(DWORD dwPage,
                                           float xtfvTarget,
                                           float ytfvTarget,
                                           float dytfTargetPage,
                                           const Gdiplus::RectF * prctfvSource) = 0;

virtual HRESULT HrBeginStructNode(DOCEXSTRUCT * pstruct) = 0;
    virtual HRESULT HrEndStructNode() = 0;
    virtual HRESULT HrBeginMarkedContent(const char * pchLangTag, const WCHAR * pwchActualText) = 0;
    virtual HRESULT HrEndMarkedContent() = 0;
};
```

FIG. 15

```
#define docexbrushtypeNil            (0)
#define docexbrushtypeSolid          (1)
#define docexbrushtypeTexture        (2)
#define docexbrushtypeGradient       (3)
#define docexbrushtypeGradientBlends (4)
#define docexbrushtypeGradientColors (5)

class DOCEXBRUSH
{
    BYTE docexbrushtype;

// Solid fill/line
    DOCEXCOLOR solid;

// Linear & radiant gradients
    struct gradient_tag
        {
        POINTF     rgpttv[2];
        DOCEXCOLOR color0;
        DOCEXCOLOR color1;
        BOOL       fGammaCorrected;
        BOOL       fRadialGradient;
        float rgflMatrixRadial[6];      //  RadialGradient only.
        struct
            {
            int    cBlendFactor;
            float* rgfBlendFactor;
            } blends;

struct
            {
            int         cColors;
            float*      rgfColorPoint;
            DOCEXCOLOR* rgcolors;
            } preset;
        } gradient;

// Texture fills
    struct texture_tag
        {
        float rgflMatrix[6];
        DOCEXIMAGE Image;
        } texture;
};
```

```
typedef enum
{
    docexlinecapFlat,
    docexlinecapRound,
    docexlinecapSquare,
} DOCEXLINECAP;

typedef enum
{
    docexdashcapFlat,
    docexdashcapRound,
    docexlinecapTriangle,
} DOCEXDASHCAP;

typedef enum
{
    docexlinejoinMiter,
    docexlinejoinRound,
    docexlinejoinBevel,
} DOCEXLINEJOIN;

class DOCEXPEN
{
    DOCEXBRUSH    brush;
    float         dztfThickness;
    DOCEXLINECAP  linecapStart;    // line cap style
    DOCEXLINECAP  linecapEnd;      // line cap style
    DOCEXLINEJOIN linejoin;        // line join style
    DOCEXDASHCAP  dashcap;         // dash cap style
    float         flMiterLimit;    // line miter limit
    int           cDashArray;      // dash array count.  must be an even number
    float *       rgflDashArray;   // dash array.  unit is in multiples of line width.
    float         flDashOffset;    // dash start point offset
    BOOL          fInsetPen;       // draw line inside the path completely?
};
```

```
struct DOCEXFONT
{
    char szFontName[docexFontNameLength];
    BOOL fBold;
    BOOL fItalic;
    BOOL fSimulateBold;
    BOOL fSimulateItalic;
    BOOL fNotEmbeddable;
};

#define docexFontNameLength 32
typedef WORD DOCEXGLYPHINDEX;

struct DOCEXTEXT
{
    DWORD            cwch;
    WCHAR*           rgwchUnicode;
    int*             rgiGlyphIndex;

DWORD            cGlyphIndicies;
    DOCEXGLYPHINDEX* rgGlyphIndicies;

BOOL             fVerticalFarEast;
    BOOL             fRTL;
    float            dytfHeight;
    float            dxfWidthScale;
    float *          rgdxtfv;              // x offsets (optional)
    float *          rgdytfv;              // y offsets (optional)

BOOL             fUseMatrix;
    float            rgflMatrix[6];
    float            msoangle;
};
```

*FIG. 18*

```
typedef enum
{
    msodocexStructTypePara = 0,
    msodocexStructTypeFigure,
    msodocexStructTypeArticle,
    msodocexStructTypeHeading,
    msodocexStructTypeTable,
    msodocexStructTypeTR,
    msodocexStructTypeTD,
    msodocexStructTypeMax,
} MSODOCEXSTRUCTTYPE;

class DOCEXSTRUCT
{
    int idNode;
    MSODOCEXSTRUCTTYPE nodetype;
    WCHAR * pwchAltText;
    int iPage;
    int ioPage;
    int iBlockID;
};
```

*FIG. 19*

EXPORTING A DOCUMENT IN MULTIPLE FORMATS

BACKGROUND

Application program developers many times provide related application programs in a software collection called a "suite." An example of one such suite is OFFICE from MICROSOFT CORPORATION of Redmond, Wash. In some situations, for example, each application program within a common suite may render output to a display device, a printer, or to a file configured to be saved on a storage media. When rendering to a file, many different file formats may be used, for example, Portable Document Format (PDF) and XML Paper Specification (XPS). With conventional systems, each individual application program within a common suite individually renders output in a specified format. Thus, the conventional strategy is to configure each individual application within a common suite with the capability to individually render output to a specified format. This often causes problems because the conventional strategy does not use, for example, a common code library such that each application program within the common suite would not need to be coded from scratch with these rendering features. For example, with the conventional strategy, programmers need to develop separate code for each application program to render output in a given format. This need, for example, tends to increase the suites development cost.

In view of the foregoing, there is a need for methods and systems for exporting a document in multiple formats more optimally from a common application program suite. Furthermore, there is a need for exporting a document in multiple formats via a common interface such that the application programs that use the common interface do not themselves render to multiple formats.

SUMMARY

Systems and methods are disclosed for exporting a document in multiple formats. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one embodiment, a method for exporting a document may comprise receiving a metafile including content associated with the document. Then, the metafile may be parsed to create at least one call. The at least one call may be configured to enable an export engine to render the document. Next the at least one call may be sent to the export engine configured to render the document in an output format associated with the export engine.

According to another embodiment, a system for exporting a document comprises a memory storage and a processing unit coupled to the memory storage. The processing unit may be operative to create a metafile including content associated with the document. In addition, the processing unit may be operative to inject comments into the metafile. The comments may comprise semantic information corresponding to the document. Also, the processing unit may be operative to parse the metafile to create at least one call. The at least one call may be configured to enable an export engine to render the document. Furthermore, the processing unit may be operative to send the at least one call to the export engine configured to render the document in an output format associated with the export engine.

In accordance with yet another embodiment, a computer-readable medium stores a set of instructions which when executed performs a method for exporting a document. The method, executed by the set of instructions, may comprise creating a metafile including content associated with the document. The metafile may be created by one of a plurality of application programs wherein each of the plurality of application programs may be configured to create the metafile in the same metafile format. Also, the method may include parsing the metafile to create at least one call. The at least one call may be configured to cause an export engine to render the document. Furthermore, the method may include sending the at least one call to the export engine configured to render the document in an output format associated with the export engine.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIGS. 4-19 illustrate exemplary function calls through application program interfaces consistent with an embodiment of the present invention.

DETAILED DESCRIPTION

Figure 1:
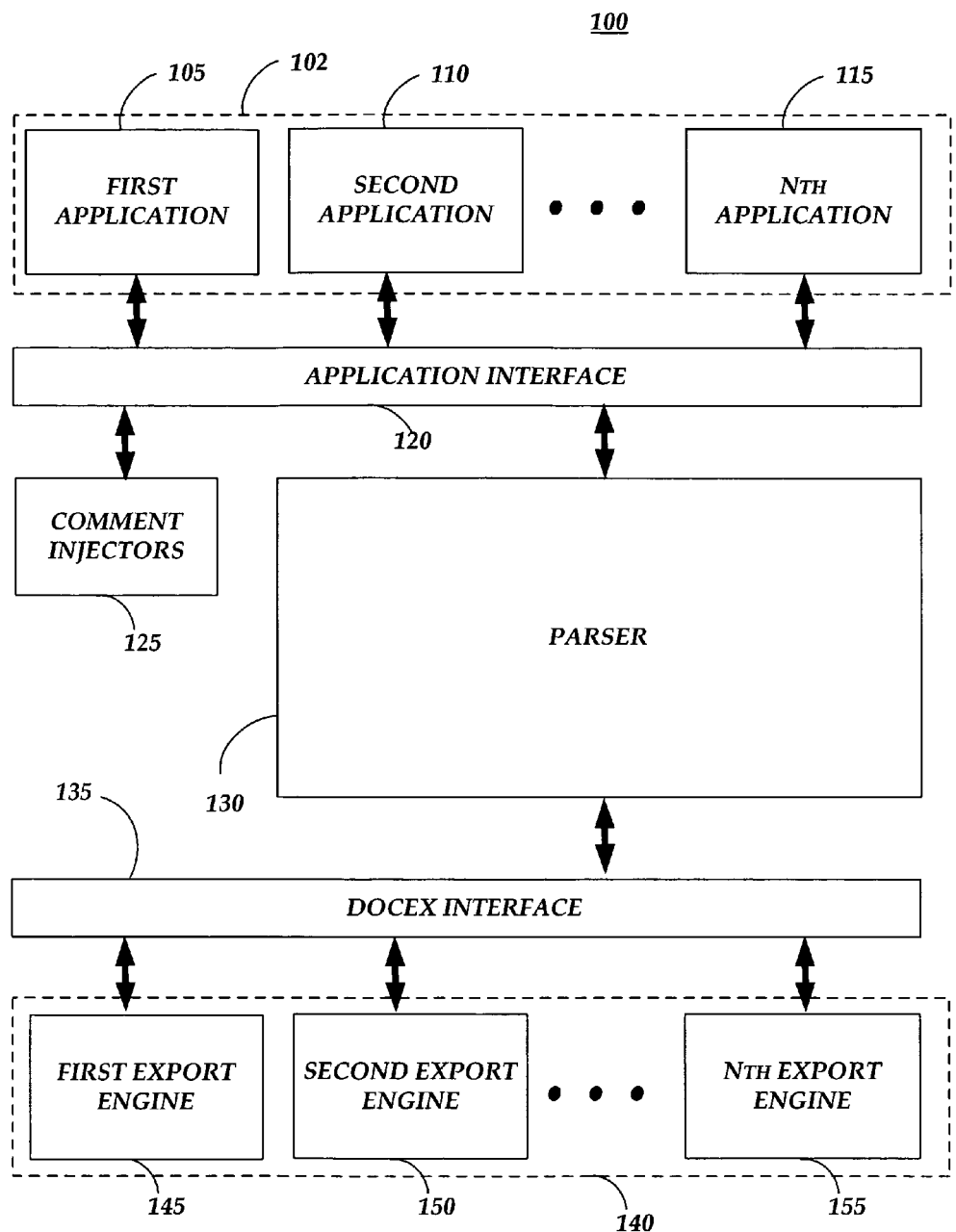
FIG. 1 is a block diagram of an exemplary document exporting system consistent with an embodiment of the present invention.

The following detailed description refers to the accompanying drawings. Wherever possible, the same reference numbers are used in the drawings and the following description to refer to the same or similar parts. While exemplary embodiments of the invention are described herein, modifications, adaptations and other implementations are possible, without departing from the spirit and scope of the invention. For example, substitutions, additions, or modifications may be made to the elements illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention export a document in multiple formats. Consistent with embodiments of the invention, a suite may include the functionality to export a document from application programs within the suite in a plurality of different formats. For example, the suite may be configured to include a common code library such that each application program within the suite would not need to have these features coded from scratch. In other words, each application program within the suite would not individually need separate code modules for each format. Instead, the suite may include a common interface that each application program may use wherein none of the individual application programs would need to know how to render to any specific format. In this way, the suite may implement multiple export formats in an export engine, thus sharing as much code as possible between the suite's application programs. For example, the code implementing the aforementioned common interface may centralize all the specific format knowledge such that the individual application programs within the suite no longer need to include this knowledge.

FIG. 1 is a block diagram of an exemplary document exporting system 100 consistent with an embodiment of the present invention. System 100 may include an application program suite 102 comprising, for example, a first application 105, a second application 110, and an Nth application 115. In addition, system 100 may include an application interface 120, comment injectors 125, a parser 130, a docex interface 135, and export engines 140. Export engines 140 may comprise a first export engine 145, a second export engine 150, and an Nth export engine 145. While application program suite 102 is described as a "suite", it may, however, comprise any collection of application programs capable of rendering output and is not limited to a suite. Furthermore, application program suite 102 may include any number of application programs. For example, application program suite 102 may comprise, but is not limited to, OFFICE from MICROSOFT CORPORATION. In addition, first application 105 may comprise a word processing application, second application 110 may comprise a spreadsheet application, and Nth application my comprise a database application. The aforementioned are exemplary, and the application programs within application program suite 102 may comprise any functionality.

In operation, the application programs within application program suite 102 may render output to an application programming interface (API) associated with an operating system 205 (described in more detail below with respect to FIG. 2.) For example, operating system 205 may comprise, but is not limited to, WINDOWS from MICROSOFT CORPORATION. When operating system 205 comprises WINDOWS, for example, the aforementioned API may comprise the Graphics Device Interface (GDI) included in WINDOWS. When an application program within application program suite 102 needs to display or print, for example, the application program creates a metafile that includes GDI function calls. Through these GDI function calls, the application program sends GDI parameters for an object that needs, for example, to be displayed or printed. GDI in turn "draws" the object by sending commands to screen or printer drivers that render images, for example, to output devices 214 as described below with respect to FIG. 2. The aforementioned metafile may comprise, but is not limited to, a WINDOWS metafile (WMF), an enhanced metafile (EMF), or EMF+. ***EMF+ (a type of metafile used to transport GDI+ drawing commands to Terminal Server as described in the Terminal Server developer kit), Consistent with an embodiment of the invention, the aforementioned metafile may be used to export a document in multiple formats. For example, first application 105 may generate a metafile using its rendering code plus comments provided by comment injectors 125. The metafile may indicate a desired format for the document. The desired format, for example, may comprise, but is not limited to PDF, PDF/A, or XPS. The aforementioned formats are examples and others may be used. First application 105 may then pass the generate metafile to parser 130 through application interface 120. Parser 130 may then analyze the metafile and determine what calls to which export engine within export engines 140 need to made. This is done in order to make the document defined by the metafile render properly through docex interface 135. Neither first application 105 nor parser 130 may know how to render the format specified by the metafile. Rather the chosen export engine takes care of the formatting details. For example, first export engine may correspond to the PDF format and second export engine my correspond to the XPS format. For example, if parser 130 determines that the metafile indicates the PDF format, docex interface 135 may use first export engine 145, thus rendering the document in PDF. Similarly, if parser 130 determines that the metafile indicates the XPS format, docex interface 135 may use second export engine 150, thus rendering the document in XPS. System 100's operation is described in greater detail below with respect to FIG. 3.

Furthermore, an embodiment consistent with the invention may comprise a system for exporting a document in multiple formats. The system may comprise a memory storage and a processing unit coupled to the memory storage. The processing unit may be operative to create a metafile including content associated with the document. In addition, the processing unit may be operative to inject comments into the metafile. The comments may comprise semantic information corresponding to the document. Also, the processing unit may be operative to parse the metafile to create at least one call. The at least one call may be configured to enable an export engine to render the document. Furthermore, the processing unit may be operative to send the at least one call to the export engine configured to render the document in an output format associated with the export engine.

Figure 2:
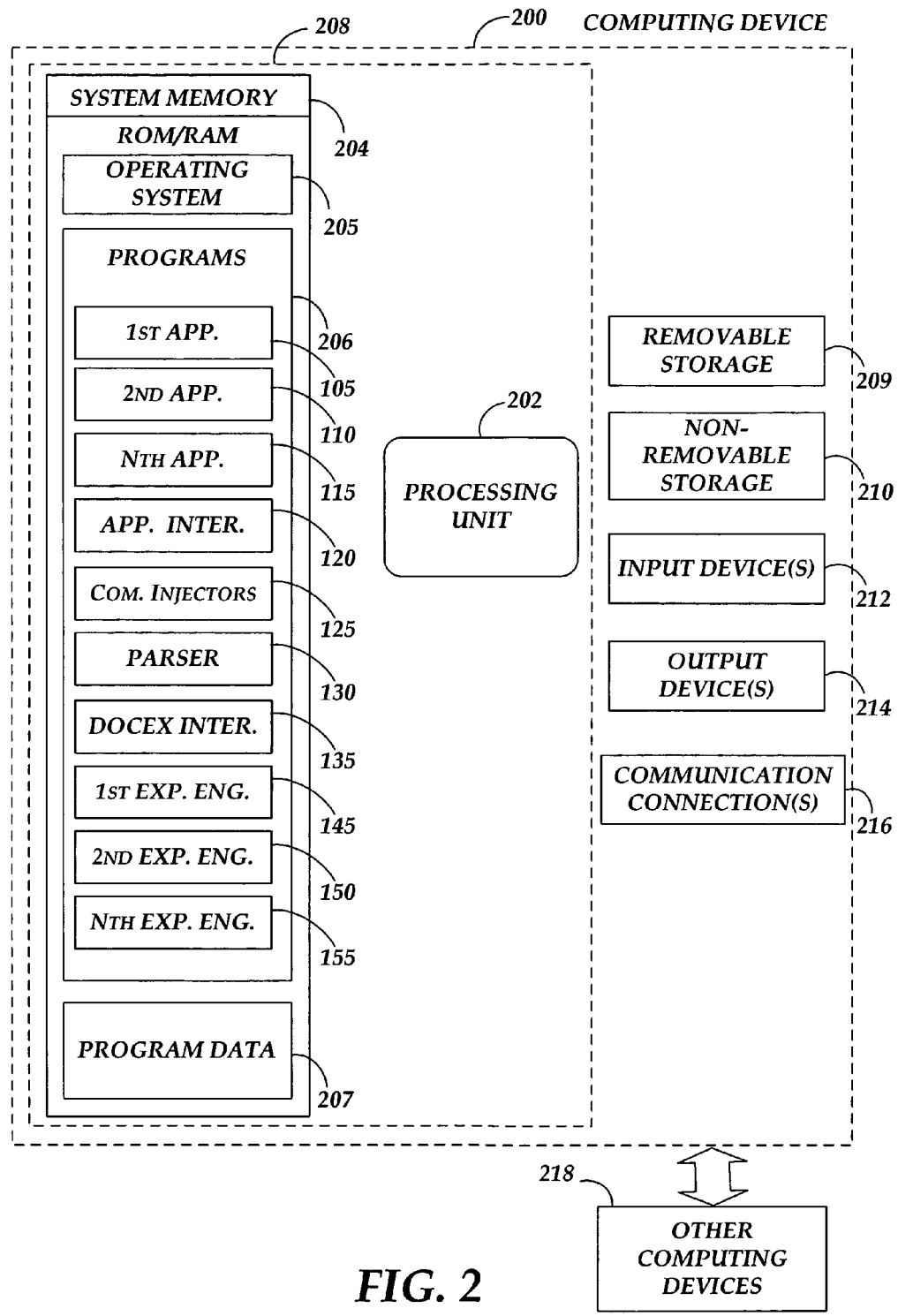
FIG. 2 is a block diagram of an exemplary system including a computing device consistent with an embodiment of the present invention.

FIG. 2 is a block diagram of an exemplary system including a computing device 200 consistent with an embodiment of the present invention. Consistent with an embodiment of the present invention, the aforementioned memory storage and processing unit may be implemented in a computing device, such as computing device 200 of FIG. 2. Any suitable combination of hardware, software, and/or firmware may be used to implement the memory storage and processing unit. By way of example, the memory storage and processing unit may be implemented with computing device 200 or any of other computing devices 218, in combination with computing device 200. The aforementioned system, device, and processors are exemplary and other systems, devices, and processors may comprise the aforementioned memory storage and processing unit, consistent with embodiments of the present invention. Furthermore, computing device 200 may comprise an exemplary operating environment for system 100 as described above. System 100 may operate in other environments and is not limited to computing device 200.

With reference to FIG. 2, one exemplary system consistent with an embodiment of the invention may include a computing device, such as computing device 200. In a basic configuration, computing device 200 may include at least one processing unit 202 and a system memory 204. Depending on the configuration and type of computing device, system memory 204 may be volatile (such as RAM), non-volatile (such as ROM, flash memory, etc.) or any combination. System memory 204 may include operating system 205, one or more programs 206, and program data 207. Operating system 205, for example, is suitable for controlling computing device 200's operation. In one embodiment, programs 206 may include first application 105, second application 110, and Nth application 115, application interface 120, comment injectors 125, parser 130, docex interface 135, first export engine 145, second export engine 150, and Nth export engine 145. Furthermore, embodiments of the invention may be practiced in conjunction with a graphics library, other operating system, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, flash memory optical disks, or tape. Such additional storage is illustrated in FIG. 2 by a removable storage 209 and a non-removable storage 210. Computer storage media may include volatile and nonvolatile, removable and non-removable media implemented in any method or technology for storage of information, such as computer readable instructions, data structures, program modules, or other data. System memory 204, removable storage 209, and non-removable storage 210 are all examples of computer storage media (i.e memory storage.) Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, etc. Output device(s) 214 such as a display, speakers, a printer, etc. may also be included. The aforementioned devices are exemplary and others may be used.

Computing device 200 may also contain a communication connection 216 that may allow device 200 to communicate with other computing devices 218, such as over a network in a distributed computing environment, for example, an intranet or the Internet. Communication connection(s) 216 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. The term computer readable media as used herein may include both storage media and communication media.

As stated above, a number of program modules and data files may be stored in system memory 204, including operating system 205. While executing on processing unit 202, programs 206 may perform processes including, for example, one or more of the stages of method 300 as described below. The aforementioned process is exemplary, and processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
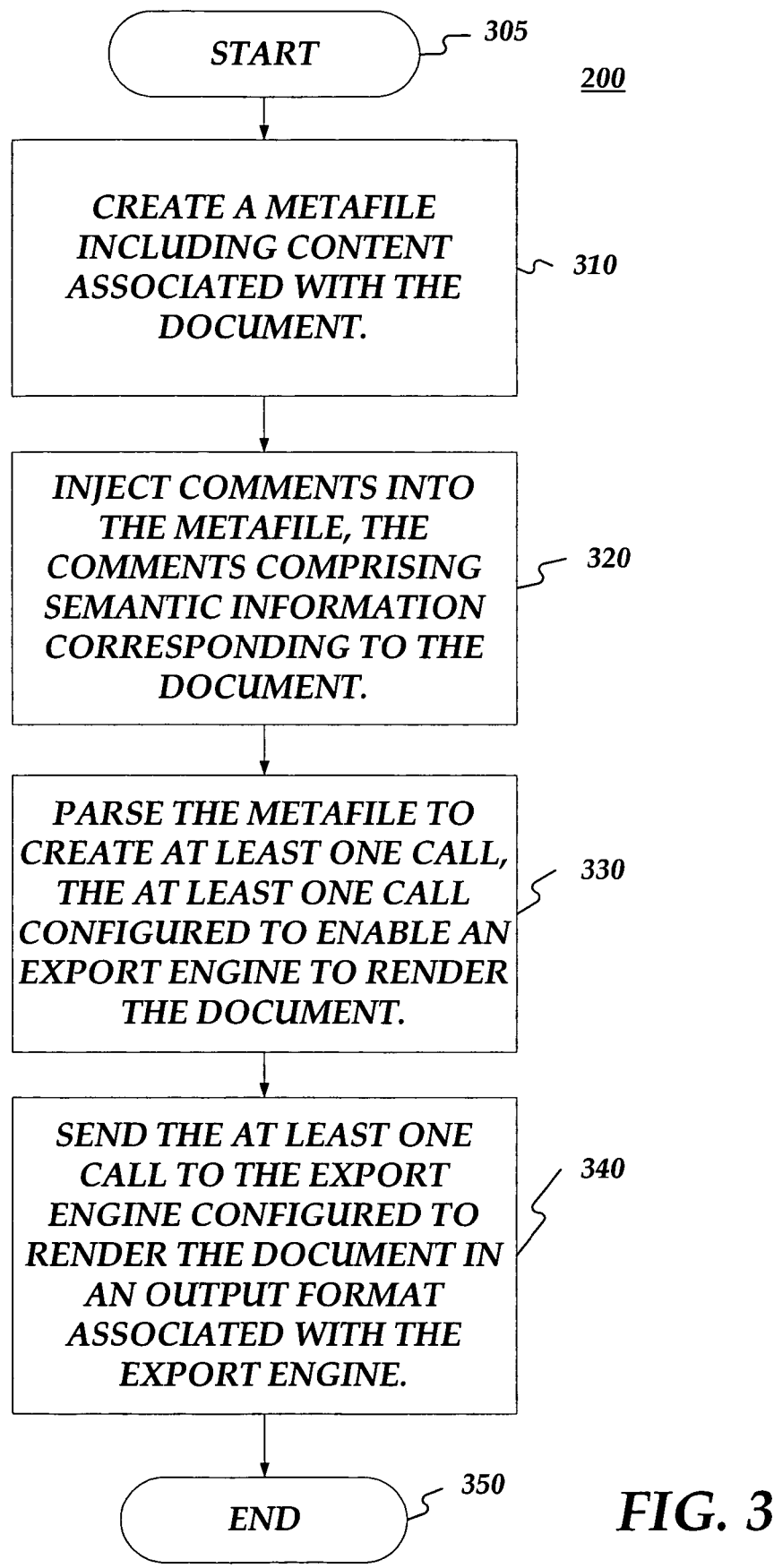
FIG. 3 is a flow chart of an exemplary method for exporting a document in multiple formats consistent with an embodiment of the present invention.

FIG. 3 is a flow chart setting forth the general stages involved in an exemplary method 300 consistent with the invention for exporting a document in multiple formats using computing device 200 of FIG. 2. Exemplary ways to implement the stages of exemplary method 300 will be described in greater detail below. Exemplary method 300 may begin at starting block 305 and proceed to stage 310 where computing device 200 may create a metafile including content associated with the document. For example, executing on computing device 200, any of first application 105, second application 110, or Nth application 115 within application program suite 102 may create the metafile. For example, application 105 may comprise a word processing application. Application 105 may render output to an API (e.g. GDI) associated with operating system 205. For example, application 105 may need to display print or save a document to storage. In order to do this, application 105 may create the metafile that includes function calls. Through these function calls, application 105 may send parameters for an object that needs, for example, to be displayed, printed, or saved. The API in turn "draws" the object in the metafile. The metafile may comprise, but is not limited to, a WINDOWS metafile (WMF), an enhanced metafile (EMF), or EMF+.

From stage 310, where computing device 200 creates the metafile, exemplary method 300 may advance to stage 320 where computing device 200 may inject comments into the metafile. The comments may comprise semantic information corresponding to the document. For example, executing on computing device 200, comment injector 125 may receive comment data from any application within application program suite 102 and inject comments into the metafile.

The metafile may contain the information necessary to render the visual elements of the document. For example, the EMF format may only define representations for visual elements. Semantic information, however, such as hyperlink destinations, accessibility information, and language information may not be represented by the EMF format. Consistent with embodiments of the invention, a specific format for passing semantic information through the metafile such that a client (e.g. parser 130) parsing the metafile can reconstruct the semantic information. Consistent with embodiments of the invention the metafile may contain both visual information and the semantic information. This may be accomplished, for example, by injecting specially-formatted comments containing the semantic information into the metafile.

The metafile, prior to comment injection, may comprise a list of drawing commands needed to render the document. At this point, the metafile may not contain any information beyond, for example, simple drawing commands such as "draw an image here" or "draw a line over there". Consequently, without injected comments, the document's important semantic (i.e. non-visual) elements, such as hyperlinks, language information on text, and accessibility information, may be lost.

For example, a document may be about to render an image that has alternate text on it. For example, alternate text may be used by document readers to describe images for users with sight impairments. As illustrated in FIG. 4, just before rendering the image, first application 105 may call MsoHrBeginStructNodeInEmf and give the alternate text for the image. After rendering the image, first application 105 may call MsoHrEndStructNodeInEmf. These two functions may inject comments in the metafile denoting that the given alternate text is associated with the image. Parser 130 may then interpret those comments and pass the information on to one of exporter engines 140 via the IDocExPage interface (as described below.) The one of exporter engines 140 may then write the alternate text to the exported file.

Consistent with embodiments of the invention, a comment section of the metafile may be used to contain the injected comments. For example, the comment section may be configured to be ignored by a programming interface configured to use the metafile to drive a peripheral device such as one of output devices 214. For example, if the EMF format is used for the metafile, EMF comments may be used to the injected semantic information. For example, the EMF format may allow for comment record types that are ignored by GDI's rendering engine, but can contain arbitrary comment information.

Document structure comments may denote how the text flows in a document and alternate text for document elements. In addition, they may form a tree. Each node may have a parent and a particular place within its siblings. Nodes may have different types denoting how they should be interpreted by the reader. For example, first application 105 may inject document structure comments by calling the function illustrated in FIG. 4. The actual comment that gets injected may have the structure illustrated in FIG. 5.

As shown in FIG. 5, ident may contain the value 0x50504E55. This may identify the comment. It is possible for other pieces of code to inject comments into the metafile. Prefacing comments with this value allows the system to identify the comments that should be looked at by parser 130. As shown in FIG. 5, iComment may contain the value msodocexcommentBeginStructNode (0x205). This may identify the comment as a BeginStructNode comment, so parser 130 can distinguish it from the other docex comment types. idNodeParent may identify the parent node of this node. Every node may have a parent, meaning that the nodes may form a tree. iSortOrder may identify the location of this node among its peers (i.e. other children of the same parent). No two nodes may have the same sort order. The sort order need not be contiguous. The sort order may allow one of the exporter engines 140 to properly order the content such that the reader can read it in the proper order even if it is not in the proper order in the metafile. idNode may be the ID of this node that may comprise a unique number identifying the node. Nodetype may identify the type of node. The following node types may be supported:

i) Articles: An article may comprise a group of nodes forming a single flow of text that may be read or searched as a contiguous block of content. Some documents may have a single article and others may have many articles;

ii) Paragraphs: A paragraph may represent a block of text within an article. It may be parented to an article;

iii) Figures: A figure may comprise a graphical element (an image or collection of shapes) that has a textual representation. The textual representation may be the alternate text used for reading or searching the document;

iv) Headings: A heading may represent an "er" heading in the text;

v) Tables: A table element may represent a block of text forming a table;

vi) Table rows: A table row element may represent a block of text forming a single row of a table; and vii) Table cells: A table cell node may represent a block of text forming a single cell of a table.

fContentNode may denote whether or not this node has content in it. Figure nodes have content comprises the textual representation of the graphical element. cwchAltText may contain the number of characters of content following the struct in the comment. The content (if there is any) may then be appended to the end of the struct in the comment. Content document structure nodes may mark the point in the content where they terminate also. To mark the end, first application 105 may call MsoHrEndStructContentNodeInEMF that may inject a comment with the form shown in FIG. 6. ident may contain the value 0x50504E55, as with other comments. iComment may contain the value msodocexcommentEndStructNode (0x206). This may identify the comment as a EndStructNode comment, so parser 130 can distinguish it from the other docex comment types.

Text run comments may be used to identify the language of each text run and to identify the original Unicode code points of the text as opposed to the glyphs which get drawn. The metafile may contain the final glyphs that get rendered on screen, not the text in the source document. In many situations, these may be the same, but there may be a number of cases where several Unicode code points gets drawn as a single glyph or even get split apart into multiple glyphs. This may happen in complex-script languages such. Because the mapping from Unicode to glyphs is context-dependent, it may be difficult to search for a given piece of text in a document containing only the glyphs. Accordingly, it may be helpful to have the original Unicode text along with the glyphs. Applications within suit 102 may inject the text run comments before and after chunks of text using the process illustrated in FIG. 7. The comment injected in the metafile may have the structure shown in FIG. 8. As shown in FIG. 8, ident may contain the value 0x50504E55, as with all of our comments. iComment may contain the value msodocexcommentBeginTextRun (0x207). This may identify the comment as a BeginTextRun comment, so parser 130 can distinguish it from the other docex comment types. lcid may give the language of the text run. cGlyphIndex may contain the number of entries in the glyph index table and may be 0. Each entry in the glyph index table may correspond to a Unicode code point in the Actual Text string, and give the index of the first glyph used to render that Unicode character. Two or more adjacent Unicode code points may have the same glyph index if they both resolve to the same glyph. cwchActualText may contain the number of characters in the actual text string. It may be 0 as well.

Hyperlink comments may denote where a particular piece of content should have a hyperlink, either internal or external. External hyperlinks may point to a URL (typically a resource on the internet). Internal hyperlinks may point to a destination within the same document, specifying a target page and position on the page. Applications in suit 102 may inject the hyperlink comments by calling, for example, one of two functions as shown in FIG. 9. The comment injected in the metafile may have the structure shown in FIG. 10. As shown in FIG. 10, ident may contain the value 0x50504E55, as with all other comments. iComment may contain the value msodocexcommentExternalHyperlink (0x201). This may identify the comment as an ExternalHyperlink comment, so parser 130 can distinguish it from the other docex comment types. rcdvRegion may contain the rectangular region of the page over which the hyperlink should be active. And wzLink may contain the destination address for the hyperlink.

Once computing device 200 injects comments into the metafile in stage 320, exemplary method 300 may continue to stage 330 where computing device 200 may parse the metafile to create at least one call. The at least one call may be configured to enable an export engine to render the document. For example, executing on computing device 200, parser 130 may receive the metafile and analyze the metafile to determine what calls to which export engine within export engines 140 need to made. This is done in order to make the document, defined by the metafile, render properly through docex interface 135. Neither first application 105 nor parser 130 knows how to render the format specified by the metafile. Rather the chosen export engine takes care of the formatting details. For example, first export engine 145 may correspond to the PDF format and second export engine 150 my correspond to the XPS format. For example, if parser 130 determines that the metafile indicates the PDF format, docex interface 135 uses first export engine 145, thus rendering the document in PDF. Similarly, if parser 130 determines that the metafile indicates the XPS format, docex interface 135 uses second export engine 150, thus rendering the document in XPS.

Application interface 120 may facilitate communication between the applications within application program suite 102 and parser 130. Application interface 120 may comprise, but is not limited to, an IMsoDocExporter interface as described in more detail below. For example, the applications within application program suite 102 may use an object implementing an IMsoDocExporter interface to export documents to multiple formats. The object implementing this IMsoDocExporter interface may be supplied by a common engine. The definition of the IMsoDocExporter interface is shown in FIG. 11.

As shown in FIG. 11, HrCreateDoc and HrCreateDocDRM may be used to start a creation process, either for non-protected or DRM-protected documents. SetOutputOption and GetOutputOption may be used to set various output options, such as how images should be handled or the specific format we want to export to. HrAddPageFromEmf may be used to add each page of the exported document. The application passes in, for example, an augmented EMF containing all of the content on that page, and the export engine uses that EMF to construct that page of the final output. HrAddExternalHyperlink and HrAddExternalHyperlink may be used to add hyperlink regions to a given page. HrAddDocumentMetadataString (and . . . . Date and . . . . CustomMetadataString) may be used to add document-level metadata, such as the document author, subject, keywords, etc. Exemplary types of metadata supported may be shown in FIG. 12.

HrSetDefaultLcid may be used to set a default language of the document. HrAddOutlineNode may be used to add a node to the document outline. This may be used by the document reader to give the user a quick way to jump to portions of the document. The structure shown in FIG. 13 may be used to describe a node in the outline. Note that FIG. 13 basically specifies the text for a given node and the destination in the document the user should be taken to when they request that node.

Docex interface 135 may facilitate communication between parser 130 and export engines 140. A design principle that may underlie docex interface 135 may comprise simplification. The metafile may be complex and difficult to properly parse. Docex interface 135 may allow export engines 140 to deal with far fewer primitives. Accordingly, there may only be a few basic primitives supported by docex interface 135. These primitives may comprise, but are not limited to, semantic information, paths, images, and text. Parser 130 may responsible for translating the metafile records into these primitive objects.

Application interface 120 may comprise, but is not limited to, an IMsoDocExporter interface as described in more detail below. Two interfaces may make up docex interface 135, IDocExDocument and IDocExPage. IDocExDocument may represent the document and IDocExPage may represent a single page in the document. IDocExDocument may allow parser 130 to set document-level properties and create pages. IDocExPage may allow parser 130 to create objects (paths, images, and text) on a particular page of the document. IDocExDocument is illustrated in FIG. 14 and IDocExPage is illustrated in FIG. 15.

As shown in FIG. 14, HrInitialize and HrInitializeEx may be called before any other methods to prepare the object. HrAppendPage may be used by parser 130 to add a new page to the end of the exported file. It returns a pointer to an IDocExPage object, which the parser can then use to add content to that page. The three HrAddDocumentMetadata methods may be used to add metadata to the document, such as the document author, title, last creation time, etc. GetDefaultLanguage/SetDefaultLanguage may be used to annotate the exported document with a default language, for example, the language most text should read in. HrFinalizeDocOutline may be used to add a document outline to the exported file. It takes a pointer to the root of the document outline. It should be called after all pages and content are added to the file. HrFinalizeDocStruct may be used to add a document structure tree to the exported file. It takes a pointer to the root of the document structure tree. It should be called after all pages and content are added to the file. HrFinalize should be the last call before HrSerialize. It may perform final authoring stages before serialization. One important stage may comprise figuring out the proper subset of glyphs necessary in each font face used in the document and then optionally embedding only the necessary glyphs. This may make exported documents significantly smaller. HrSerialize may write the file to disk with the final file name.

As shown in FIG. 15, IDocExPage::HrFinalize may be called after all content is added to a page to signify that the caller is done adding content. Regarding IDocExPage::FsupportedDocexPen, parser 130 may choose to support or not support various types of pens. Parser 130 can call this process to determine which pens are supported by the parser. The object may return true if the pen can be rendered natively, or false if it should be flattened. IDocExPage::HrRenderPath may be one of the three core rendering processes on a page. It may be used to render a path on the page with a given set of points, a brush or a pen or both, and a clipping path. All shapes drawn on a page may end up being paths, including lines, circles, many pictures, and metafiles. A path can render with either a brush or a pen, or both. A brush may be used to fill the interior region of the path, and a pen may be used to stroke the outline. One of export engines 140 may be responsible for converting these structures into the form in which the export format expects. A brush may be defined by the DOCEXBRUSH structure (FIG. 16). Note that there may be various types of brushes: solid fills, gradients of several sorts, and texture (e.g. picture) fills. One of export engines 140 may support all of these.

A pen maybe defined by the DOCEXPEN structure as shown in FIG. 17. A pen may contain a brush that may be used to fill the interior of the stroke, but only solid brushes may be supported here. Brushes can have various line cap styles, dash types, dash cap styles, and join styles. The brushes can be inset inside the path or centered on the path and can be of any thickness. A clipping path on a path may be used to define a region to which drawing may be clipped. This may be supported by the export engines 140. Callers may pass NULL for the clipping path.

HrRenderImage may be used to add an image (e.g. a bitmap) to a page. The position may be specified as three points on the page representing three vertices of the rendered bitmap. A clipping path may optionally be given. HrStartMetafile and HrEndMetafile maybe used to bracket content which should be drawn within a specified portion of the page. Coordinates of all paths between HrStartMetafile and HrEndMetafile may be translated to be relative to that portion of the page. HrRenderText may be used to add glyphs to the page at a particular position. As illustrated in FIG. 18, a solid brush may be given for the glyphs to be filled with, along with the font to be used and the position of the text. Note that both the Unicode code points for the text and the glyph indices are given at once; this allows the exporter to embed accessibility information in the exported document.

HrAddExternalHyperlink/HrAddInternalHyperlink may be used to add internal and external hyperlink hot spots to the given document. HrBeginStructNode/HrEndStructNode may be used to add accessibility structure information to a given section of the document. Content (e.g. text, images, paths) that may be added between calls to these functions may be considered part of the node. Note that nodes can be nested, therefore paired calls to these functions can be nested. As illustrated in FIG. 19, there may be a number of types of structure nodes, listed in the MSODOCEXSTRUCTTYPE enumeration. Document structure may be used for a number of purposes. First, screen readers may use it to understand the content in the document better. Second, it may be used for searching the document. Third, it may be used to reflow the content in the document for different size pages (such as reading a PDF online on a very small screen). Calls to these functions maybe optional, for example, not all content need be embedded in a structure node. In addition, each node may have alternate text. This may be used, for example, to provide alternate text for an image or a group of elements which have a textual representation for sight-impaired users. Consistent with HrBeginMarkedContent/HrEndMarkedContent, content may be marked with a given language by bracketing it within calls to these functions. The actual text to be associated with the given span of content may also be specified.

After computing device 200 parses the metafile in stage 330, exemplary method 300 may proceed to stage 340 where computing device 200 may send the at least one call to the export engine configured to render the document in an output format associated with the export engine. For example, executing on computing device 200, one of export engines 140 may receive one or more function calls from parser 130. For example, if parser 130 determines that the application requests the PDF format, and if first export engine 145 corresponds to the PDF format, docex interface 135 may select first export engine 145, thus rendering the document in PDF. Consequently, embodiments of the invention may ultimately render in an output format consistent with user input indicating the output format associated with the selected export engine. After computing device 200 sends the at least one call to the export engine in stage 340, exemplary method 300 may then end at stage 350.

Generally, consistent with embodiments of the invention, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the stages of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for exporting a document, the method comprising:
   receiving a metafile including content associated with the document, the metafile comprising semantic information including at least one of the following: hyperlink destinations, accessibility information, and language information corresponding to the document, wherein receiving the metafile comprises receiving the metafile from one of a plurality of application programs, the plurality of application programs being associated with an application program suite having a common code library;
   parsing the metafile to create at least one call, the at least one call configured to enable an export engine to render the document; and
   sending the at least one call to the export engine configured to render the document in an output format associated with the export engine, wherein the export engine is selected from a plurality of export engines based upon user input indicating the output format associated with the selected export engine, the plurality of export engines each corresponding to and being functional with the plurality of application programs associated with the application program suite.

2. The method of claim 1, wherein receiving the metafile further comprises receiving the metafile including injected comments.

3. The method of claim 2, wherein receiving the metafile including the injected comments comprises receiving the metafile including the injected comments comprising the semantic information corresponding to the document.

4. The method of claim 2, wherein receiving the metafile including the injected comments comprises receiving the metafile including injected comments included in at least one comment section of the metafile, the at least one comment section configured to be ignored by a programming interface configured to use the metafile to drive at least one peripheral device.

5. The method of claim 1, wherein receiving the metafile further comprises receiving the metafile comprising one of the following formats: WINDOWS metafile (WMF), enhanced metafile (EMF), and enhanced metafile plus (EMF+).

6. The method of claim 1, wherein parsing the metafile to create the at least one call further comprises parsing the metafile to create the at least one call including at least one of the following primitive types: paths, images, text, and semantic information.

7. The method of claim 1, wherein parsing the metafile further comprises parsing the metafile received from one of the plurality of application programs, each of the plurality of application programs configured to create the metafile in the same metafile format.

8. The method of claim 1, wherein sending the at least one call to the export engine configured to render the document in the output format associated with the export engine further comprises sending the at least one call to the export engine configured to render the document in the output format comprising one of the following: portable document format (PDF), XML paper specification (XPS), and PDF/A.

9. The method of claim 1, further comprising analyzing the metafile to determine which calls to which export engines need to be made.

10. A system for exporting a document, the system comprising:
    a memory storage; and
    a processing unit coupled to the memory storage, wherein the processing unit is operative to:
      create a metafile including content associated with the document, wherein the metafile is compatible with a plurality of application programs having a common code library;
      inject comments into the metafile, the comments comprising semantic information including at least one of the following: hyperlink destinations, accessibility information, and language information corresponding to the document;
      parse the metafile to create at least one call, the at least one call configured to enable an export engine to render the document; and
      send the at least one call to the export engine configured to render the document in an output format associated with the export engine, wherein the export engine is selected from a plurality of export engines based upon user input indicating the output format associated with the selected export engine, the plurality of export engines each corresponding to and being functional with the plurality of application programs associated with the application program suite.

11. The system of claim 10, wherein the processing unit being operative to create the metafile further comprises the processing unit being operative to create the metafile comprising one of the following formats: WINDOWS metafile (WMF), enhanced metafile (EMF), and enhanced metafile plus (EMF+).

12. The system of claim 10, wherein the processing unit being operative to parse the metafile to create the at least one call further comprises the processing unit being operative to parse the metafile to create the at least one call including at least one of the following primitive types: paths, images, text, and the semantic information.

13. The system of claim 10, wherein the processing unit being operative to parse the metafile further comprises the processing unit being operative to parse the metafile received from one of the plurality of application programs, each of the plurality of application programs configured to create the metafile in the same metafile format.

14. The system of claim 10, wherein the processing unit being operative to send the at least one call to the export engine configured to render the document in the output format associated with the export engine further comprises the processing unit being operative to send the at least one call to the export engine configured to render the document in the output format comprising one of the following: portable document format (PDF), XML paper specification (XPS), and PDF/A.

15. The system of claim 10, wherein the processing unit is further operative to analyze the metafile to determine which calls to which export engines need to be made.

16. A computer-readable storage medium which stores a set of instructions which when executed performs a method for exporting a document, the method executed by the set of instructions comprising:

creating a metafile including content associated with the document, the metafile created by one of a plurality of application programs, each of the plurality of application programs being associated with an application program suite having a common code library and being configured to create the metafile in the same metafile format, wherein creating the metafile comprises injecting document structure comments into the metafile, the document structure comments comprising image comments associated with at least one figure comprising a graphical element that has a textual representation, the textual representation being an alternate text used for at least one of: reading and searching the document;

parsing the metafile to create at least one call, the at least one call configured to cause an export engine to render the document; and sending the at least one call to the export engine configured to render the document in an output format associated with the export engine, wherein the export engine is selected from a plurality of export engines based upon user input indicating the output format associated with the selected export engine, the plurality of export engines each corresponding to and being functional with the plurality of application programs associated with the application program suite.

17. The computer-readable storage medium of claim 16, wherein creating the metafile further comprises creating the metafile including the injected comments indicating a desired document format.

18. The computer-readable storage medium of claim 16, wherein creating the metafile further comprises creating the metafile comprising one of the following formats: WINDOWS metafile (WMF), enhanced metafile (EMF), and enhanced metafile plus (EMF+).

19. The computer-readable storage medium of claim 16, wherein parsing the metafile to create the at least one call further comprises parsing the metafile to create the at least one call including at least one of the following primitive types: paths, images, text, and the semantic information.

20. The computer-readable storage medium of claim 16, further comprising analyzing the metafile to determine which calls to which export engines need to be made.

* * * * *